(12) United States Patent  (10) Patent No.: US 10,228,699 B2
Murao  (45) Date of Patent: Mar. 12, 2019

(54) IMAGE GENERATION APPARATUS

(71) Applicant: DENSO CORPORATION, Kariya, Aichi-pref. (JP)

(72) Inventor: Toshikazu Murao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 15/159,473

(22) Filed: May 19, 2016

(65) Prior Publication Data
US 2016/0344916 A1  Nov. 24, 2016

(30) Foreign Application Priority Data

May 21, 2015 (JP) .................. 2015-103571

(51) Int. Cl.
| H04N 5/232 | (2006.01) |
| G05D 1/02 | (2006.01) |
| H04N 5/235 | (2006.01) |
| H04N 5/243 | (2006.01) |

(52) U.S. Cl.
CPC ......... *G05D 1/0246* (2013.01); *H04N 5/2351* (2013.01); *H04N 5/2353* (2013.01); *H04N 5/243* (2013.01); *H04N 5/2357* (2013.01)

(58) Field of Classification Search
None
See application file for complete search history.

(56) References Cited

U.S. PATENT DOCUMENTS

| 2004/0165091 | A1  | 8/2004 | Takemura et al. |
| 2007/0058048 | A1* | 3/2007 | Kinugasa ............... H04N 5/235 348/211.99 |
| 2007/0080975 | A1* | 4/2007 | Yamashita ............... G09G 5/04 345/591 |
| 2008/0170124 | A1* | 7/2008 | Hatanaka ................ G06T 5/004 348/208.4 |
| 2009/0002520 | A1* | 1/2009 | Yoshida ............... H04N 5/2351 348/226.1 |

(Continued)

FOREIGN PATENT DOCUMENTS

| EP | 1515547 A2 | 3/2005 |
| JP | 2005-318569 | 11/2005 |

(Continued)

*Primary Examiner* — Eileen M Adams
(74) *Attorney, Agent, or Firm* — Knobbe, Martens, Olson & Bear, LLP

(57) ABSTRACT

In an image generation apparatus, an image of a periphery of an own vehicle is captured using an imaging operation of a camera mounted in the own vehicle in a first state that is suitable for capturing an image for recognizing information illustrated on a display board, at a predetermined first timing, and a first captured image is generated from the image captured in the first state. An image of the periphery of the own vehicle is captured using an imaging operation of the camera in a second state that is suitable for capturing an image for recognizing information displayed by light emitted from an electronic display apparatus, at a predetermined second timing, and a second captured image is generated from the image captured in the second state. A process using the first captured image and the second captured image is performed.

6 Claims, 9 Drawing Sheets

(56) References Cited

U.S. PATENT DOCUMENTS

2010/0283855 A1* 11/2010 Becker ............... G06K 9/00818
                                                          348/148
2012/0200708 A1    8/2012  Fukuda
2012/0229645 A1*   9/2012  Yamada ............... B60Q 1/2665
                                                          348/148

FOREIGN PATENT DOCUMENTS

| JP | 2006-245784   | 9/2006  |
| JP | 2008-262467 A | 10/2008 |
| JP | 2011-234318   | 11/2011 |
| JP | 2014-153167   | 8/2014  |

* cited by examiner

IMAGE GENERATION APPARATUS

CROSS-REFERENCE TO RELATED APPLICATION

This application is based on and claims the benefit of priority from Japanese Patent Application No. 2015-103571, filed May 21, 2015. The entire disclosure of the above application is incorporated herein by reference.

BACKGROUND

Technical Field

The present disclosure relates to an image generation apparatus.

Related Art

A technique is known in which, when an image of the periphery of an own vehicle is captured, exposure time is set based on a vehicle speed of the own vehicle and brightness of the periphery of the own vehicle. Blurring of the captured image is thereby kept within a certain range (refer to Japanese Patent Publication No. 5421999). As a result, the accuracy of recognition of a sign illustrated on a display board or the like from the captured image is improved.

However, when the exposure time is shortened to reduce blurring, flicker occurs when an image of an electronic display apparatus is captured. The accuracy of recognition of a sign displayed by light emitted from the electronic display apparatus, from the captured image, decreases.

SUMMARY

It is thus desired to perform, with high accuracy, a process based on information illustrated on a display board and information displayed on an electronic display apparatus, using a single camera.

A first exemplary embodiment of the present disclosure provides an image generation apparatus that includes: first imaging means that captures, by an imaging operation of a camera mounted in an own vehicle, an image of a periphery of the own vehicle in a first state that is suitable for capturing an image for recognizing information illustrated on a display board, at a predetermined first timing, and acquires a first captured image from the image captured in the first state; second imaging means that captures, by an imaging operation of the camera, an image of the periphery of the own vehicle in a second state that is suitable for capturing an image for recognizing information displayed by light emitted from an electronic display apparatus, at a predetermined second timing, and acquires a second captured image from the image captured in the second state; and executing means for performing a process based on the first captured image acquired by the first imaging means and the second captured image acquired by the second imaging means.

As a result of a configuration such as this, a captured image that is suitable for recognizing information illustrated on a display board and a captured image that is suitable for recognizing information displayed by light emitted from an electronic display apparatus are generated with a single camera. Therefore, through selective use of these images, both the information illustrated on the display board and the information displayed on the electronic display apparatus can be recognized with high accuracy. As a result, a process based on the information illustrated on the display board and the information displayed on the electronic display apparatus can be performed with high accuracy using the single camera.

A second exemplary embodiment of the present disclosure provides an image generation apparatus that includes: imaging means that captures, by a plurality of imaging operations of a camera mounted in an own vehicle, a plurality of images of a periphery of the own vehicle, at an exposure time enabling blurring of each of the plurality of images captured using the plurality of imaging operations to be kept within a predetermined allowable range, at a predetermined timing, and acquires a plurality of captured images from the plurality of images captured using the plurality of imaging operations; generating means that corrects positional misalignment among the plurality of captured images acquired at the predetermined timing, and subsequently generates a composite image by combining the plurality of captured images with one another; and executing means that performs a process based on the composite image.

As a result of a configuration such as this, a plurality of captured images in which blurring is reduced is generated with a single camera. In addition, after positional misalignment among these captured images is corrected, a composite image of these captured images is generated. Blurring is suppressed in each captured image. Therefore, information illustrated on a display board can be recognized with high accuracy from the composite image. In addition, because images captured using a plurality of imaging operations are combined, luminance distribution can be made suitable for recognition of information displayed on an electronic display apparatus. Therefore, a process based on the information illustrated on the display board and the information displayed on the electronic display apparatus can be performed with high accuracy using the single camera.

DESCRIPTION OF THE EMBODIMENTS

Embodiments to which the present disclosure is applied will hereinafter be described with reference to the drawings.

First Embodiment

[Description of the Configuration]

Figure 1:
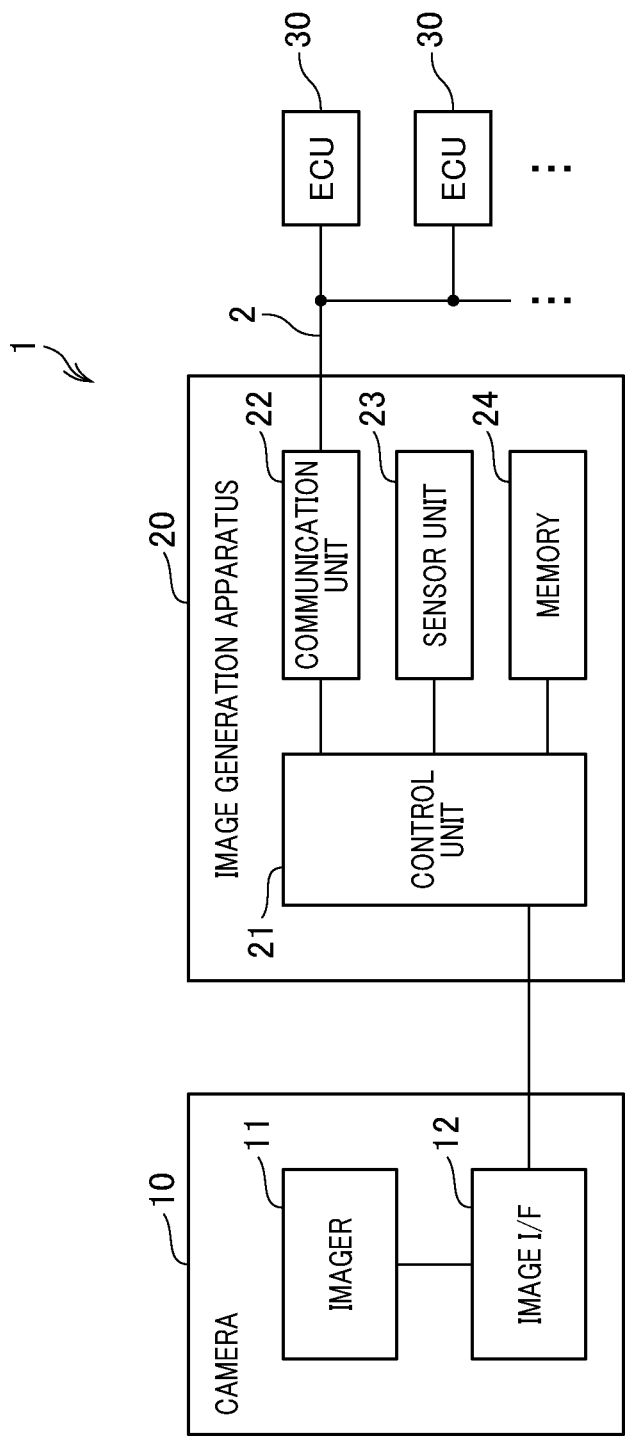
FIG. 1 is a block diagram of an image generation system according to a first embodiment.

As shown in FIG. 1, an image generation system 1 according to a first embodiment is mounted in a vehicle (hereinafter referred to as an "own vehicle"), and includes a camera 10 that captures an image of a periphery of the own vehicle, an image generation apparatus 20, and the like.

The camera 10 includes an imager 11, an image interface (I/F) 12, and the like.

The imager 11 includes an image sensor, an amplifying unit, an analog-to-digital (A/D) converting unit, and the like. The image sensor may be a charge-coupled device (CCD) image sensor or a complementary metal-oxide-semiconductor (CMOS) image sensor.

In the imager 11, when the image sensor captures an image, the amplifying unit amplifies an analog signal outputted from the image sensor, by a predetermined gain. The analog signal indicates luminance (brightness) of each pixel in the captured image. In addition, the A/D converting unit converts an analog value indicated by the amplified analog signal to a digital value. Then, the imager 11 outputs signals indicating the digital values (i.e., output pixel value of each pixel configuring the captured image) as image data, in units of line (i.e., an aggregation of image data corresponding to pixels arrayed in a horizontal scan direction).

The image I/F 12 outputs the image data generated by the imager 11 to the image generation apparatus 20.

The image generation apparatus 20 includes a control unit 21, a communication unit 22, a sensor unit 23, a memory 24, and the like.

The control unit 21 is mainly configured by a known microcomputer. The microcomputer includes a central processing unit (CPU), a read-only memory (ROM), a random access memory (RAM), an input/output (I/O), a bus line connecting these components, and the like. The control unit 21 performs various processes based on programs stored in the ROM and programs loaded onto the RAM. In addition, the control unit 21 captures images of the periphery of the own vehicle with the camera 10. Furthermore, the control unit 21 sets exposure time, exposure frequency, gain, and the like of the camera 10.

The communication unit 22 performs communication with another electronic control unit (ECU) 30 mounted in the own vehicle, via an on-board local area network (LAN) 2 such as a controller area network (CAN).

The sensor unit 23 detects the vehicle speed of the own vehicle.

The memory 24 is a section for storing therein image data of the image captured by the camera 10, and includes the RAM and the like.

[Processes]

In the image generation system 1 according to the first embodiment, the camera 10 captures an image of the periphery of the own vehicle at an imaging timing that periodically arrives. Then, based on the captured image, the image generation system 1 or the other ECU 30 performs a driving-related process. In the driving-related process, image recognition of the captured image is performed. Then, based on the result of image recognition, a process related to driving of the own vehicle is performed.

As examples of the driving-related process, a driving assistance process, a process for enabling automatic cruising, and the like can be considered. More specifically, for example, a process in which another vehicle, a pedestrian, or the like is detected, and issuing of a warning, vehicle speed control, steering angle control, or the like is performed to avoid collision can be considered. Furthermore, a process in which deviation from a traffic lane is detected, a process in which headlight direction or the like is controlled, and like can be considered.

The image generation system 1 generates a plurality of types of captured images during imaging at an imaging timing. The captured images include a first captured image (hereinafter referred to as a "first frame") that is suitable for image recognition of a signboard sign as a result of blurring being suppressed. In addition, the captured images include a second captured image (hereinafter referred to as a "second frame") that is suitable for image recognition of an electronic sign as a result of flicker being suppressed. The signboard sign refers, for example, to information of a sign painted on a display board or the like. The electronic sign refers to information displayed by light emitted from an electronic display apparatus. Processes performed by the image generation system 1 will be described in detail, below.

(1) Imaging Process

Figure 2:
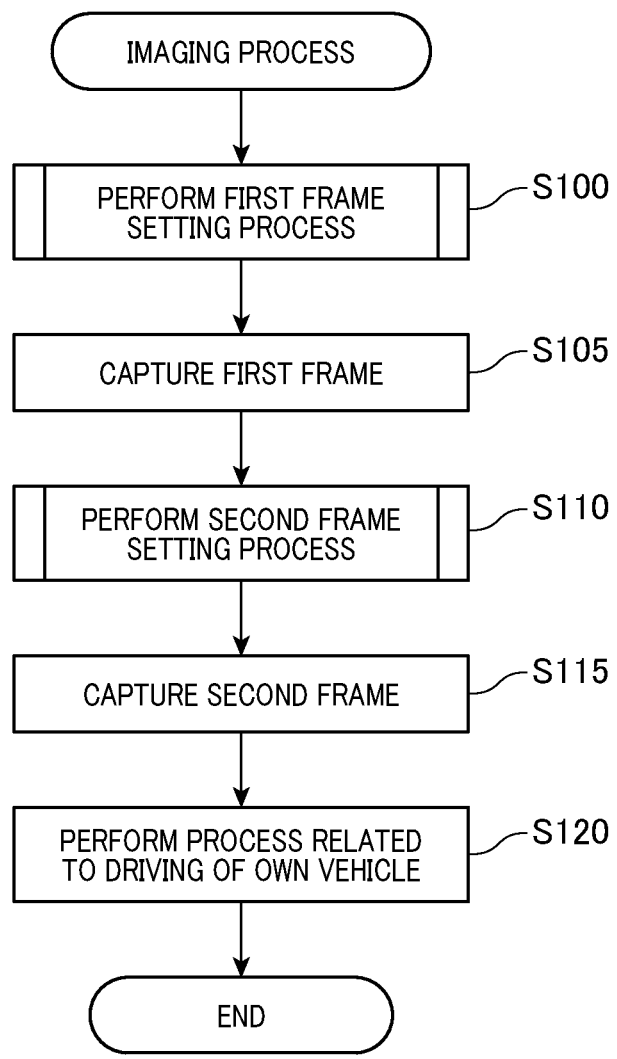
FIG. 2 is a flowchart of an imaging process according to the first embodiment.

First, an imaging process for generating the first and second frames will be described (FIG. 2). The image generation apparatus 20 performs the present process when a periodic imaging timing arrives.

At step S100, the control unit 21 of the image generation apparatus 20 performs a first frame setting process (details are described hereafter) in which the camera 10 is set to a first state that enables imaging of the first frame. The control unit 21 then proceeds to step S105.

At step S105, the control unit 21 captures the first frame with the camera 10. In addition, the control unit 21 acquires the first frame from the camera 10 and stores the first frame in the memory 24. The control unit 21 then proceeds to step S110.

At step S110, the control unit 21 performs a second frame setting process (details are described hereafter) in which the camera 10 is set to a second state that enables imaging of the second frame. The control unit 21 then proceeds to step S115.

At step S115, the control unit 21 captures the second frame with the camera 10. In addition, the control unit 21 acquires the second frame from the camera 10 and stores the second frame in the memory 24. The control unit 21 then proceeds to step S120.

At step S120, the control unit 21 reads out the first and second frames from the memory 24. The control unit 21 then enables the driving-related process based on the first and second frames to be performed. The control unit 21 ends the present process. Specifically, for example, when the image generation apparatus 20 performs the driving-related process, the control unit 21 may give the first and second frames to the section performing the driving-related process, and make the section start the driving-related process. In addition, for example, when the other ECU 30 performs the driving-related process, the control unit 21 may transmit the first and second frames to the ECU 30 via the on-board LAN 2, and make the ECU 30 perform the driving-related process.

(2) First Frame Setting Process

Figure 3:
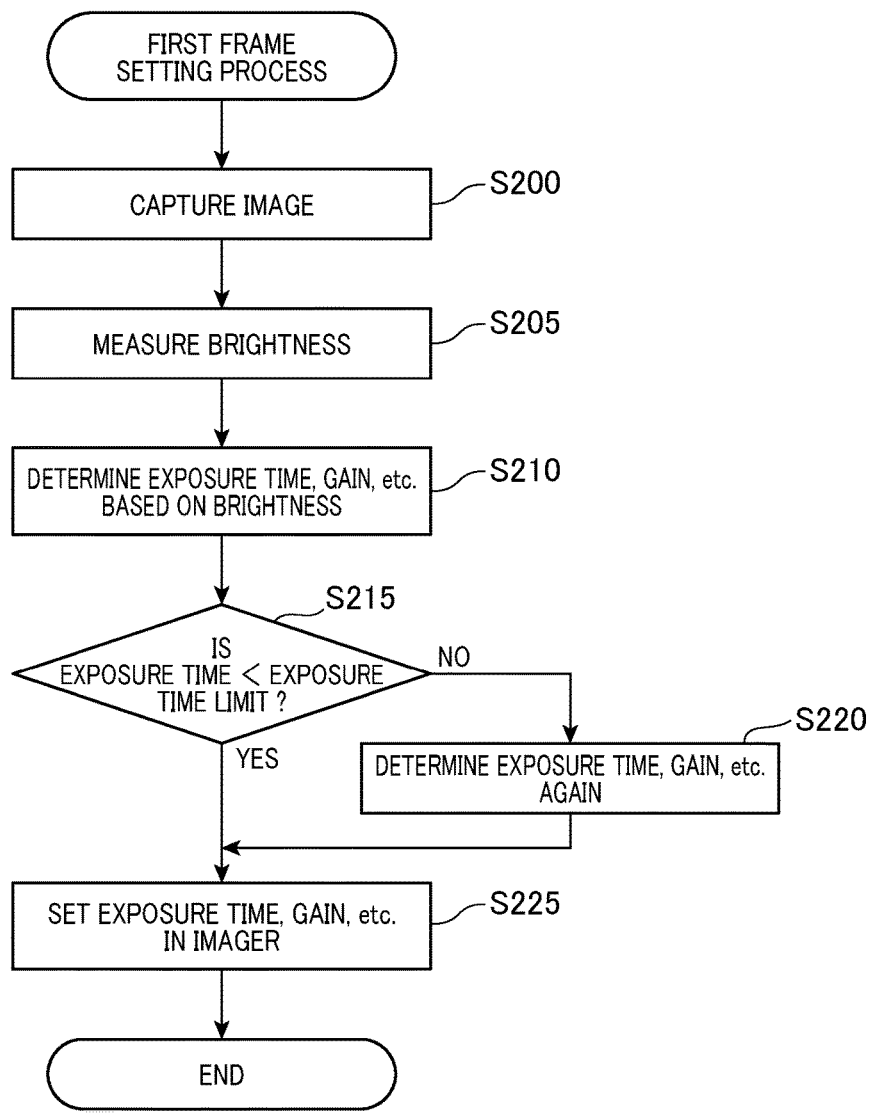
FIG. 3 is a flowchart of a first frame setting process according to the first embodiment.

Next, the first frame setting process will be described (FIG. 3). In the first frame setting process, the camera 10 is set to a state enabling the first frame to be captured. The present process is configured as a subroutine that is called from the imaging process.

At step S200, the control unit 21 of the image generation apparatus 20 performs imaging with the camera 10 in a state in which exposure time, gain, and the like are set to preset values prescribed in advance. The control unit 21 then measures the brightness of the periphery of the own vehicle based on the luminance of each pixel in the captured image (step S205).

At subsequent step S210, the control unit 21 determines the exposure time, the gain, and the like of the camera 10 that are suitable for imaging the first frame, based on the measurement value of brightness. The control unit 21 then proceeds to step S215.

At step S215, the control unit 21 determines whether or not the determined exposure time is less than an exposure time limit. The exposure time limit is predetermined based on the vehicle speed of the own vehicle and a predetermined allowable blurring range. Here, the exposure time limit is predetermined in the following manner.

That is, the allowable blurring range of the first frame is predetermined based on the content of the driving-related process performed based on the first frame. In addition, the tendency for blurring to occur differs depending on the vehicle speed of the own vehicle, whether it is day or night, and the like. Therefore, a maximum exposure time (exposure time limit) is predetermined based on the vehicle speed of the own vehicle, for day and for night. The maximum exposure time is the maximum amount of time enabling blurring to be kept within the allowable range.

Figure 4:
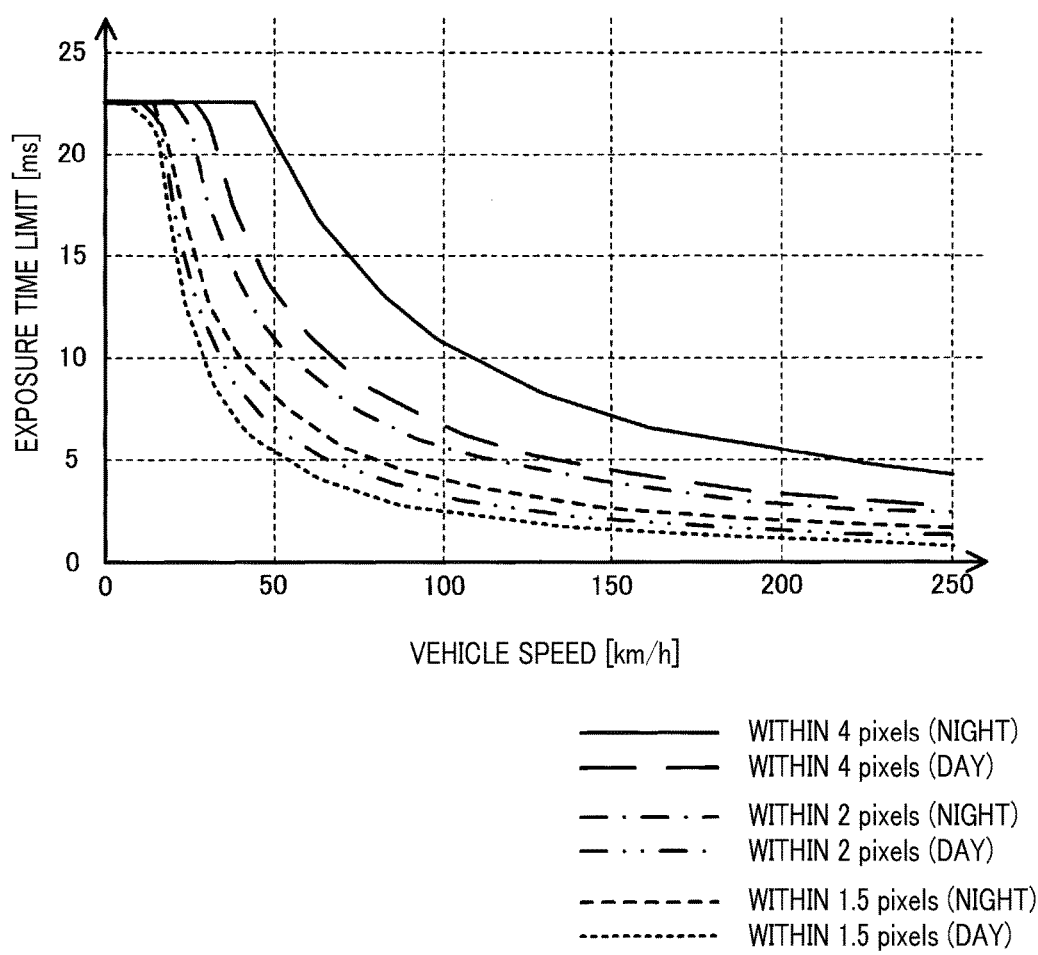
FIG. 4 is a graph showing a relationship between vehicle speed and exposure limit time.

The graphs in FIG. 4 respectively indicate the exposure time limit in relation to vehicle speed for day and for night, when the allowable blurring range is within 4 pixels, within 2 pixels, and within 1.5 pixels. In the driving-related process, image recognition targeting an area closer the own vehicle is performed at night, compared to during the day. At night, objects present in a distant area are not subjected to image recognition. Therefore, blurring does not cause a problem should the blurring, when an object present in an area near the own vehicle is imaged, be within the allowable range. The exposure time limit for night is longer than that for day at the same vehicle speed, even when the allowable blurring range is the same.

The ROM of the control unit 21 stores therein an exposure time limit determination table that corresponds to each graph (the graphs respectively corresponding to the allowable blurring ranges, for day and for night). The control unit 21 detects the vehicle speed of the own vehicle via the sensor unit 23. In addition, the control unit 21 determines whether it is day or night based on the measurement value of brightness. The control unit 21 then references the exposure time limit determination table corresponding to the allowable blurring range predetermined based on the content of the driving-related process, and the determination result regarding day or night, and determines the exposure time limit based on the vehicle speed of the own vehicle.

Then, when determined that the exposure time is less than the exposure time limit (i.e. Yes at step S215), the control unit 21 proceeds to step S225. When determined that the exposure time is equal to or more than the exposure limit time (i.e, No at step S215), the control unit 21 proceeds to step S220.

At step S220, the control unit 21 determines the exposure time and the gain, again. Specifically, the control unit 21 may increase luminance of the captured image in the following manner:

exposure time=exposure time limit determined at step S215 new gain=gain determined at step S210×exposure time determined at step S210/exposure time limit determined at step S215

At subsequent step S225, the control unit 21 sets the determined exposure time, gain, and the like in the imager 11 of the camera 10, and ends the present process.

(3) Second Frame Setting Process

Figure 5:
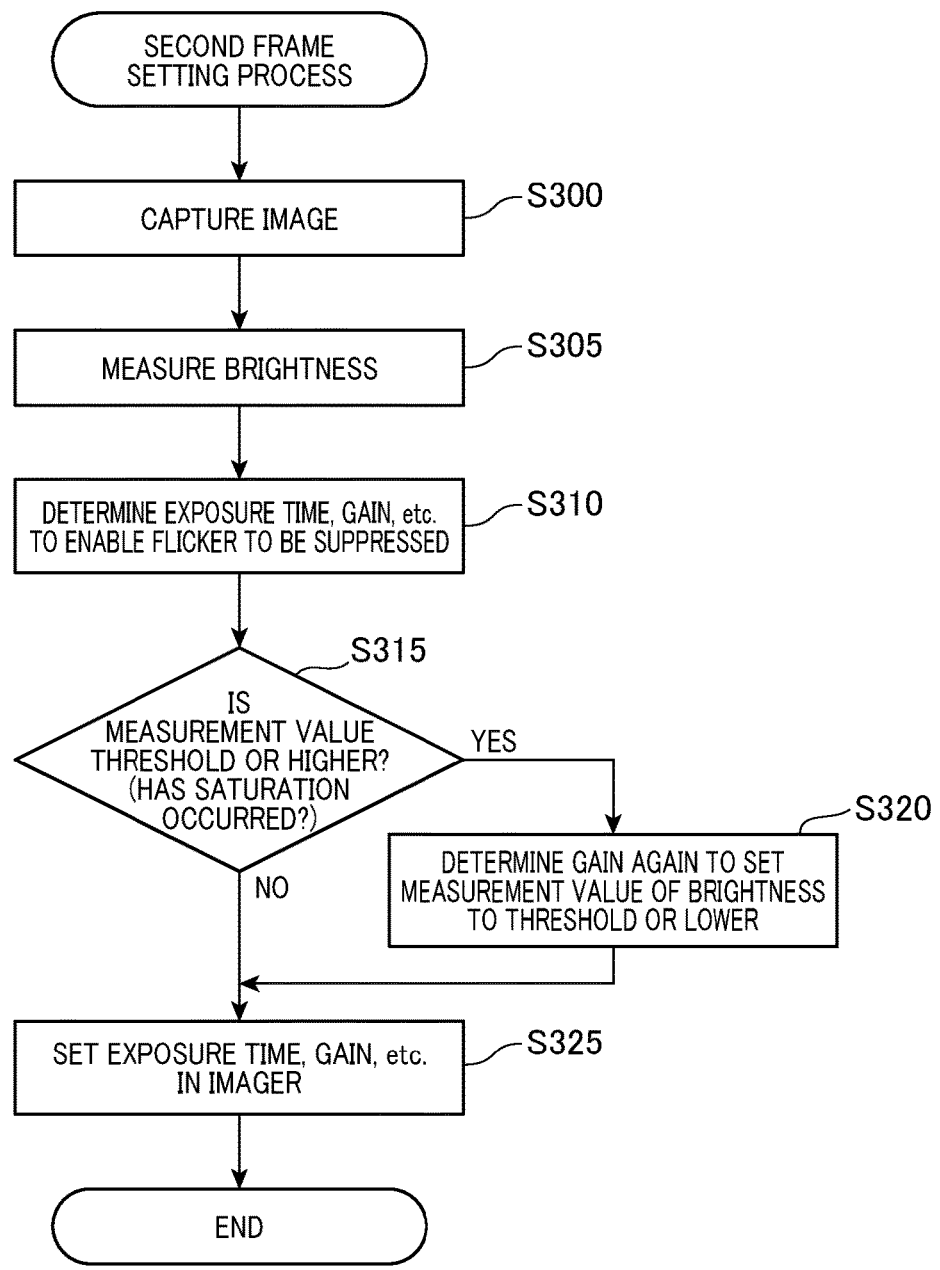
FIG. 5 is a flowchart of a second frame setting process according to the first embodiment.

Next, the second frame setting process will be described (FIG. 5). In the second frame setting process, the camera 10 is set to a state enabling the second frame to be captured. The present process is configured as a subroutine that is called up from the imaging process.

At step S300, the control unit 21 of the image generation apparatus 20 performs imaging with the camera 10 in a state in which exposure time, gain, and the like are set to preset values prescribed in advance. The control unit 21 then measures the brightness of the periphery of the own vehicle based on the luminance of each pixel in the captured image (step S305).

At subsequent step S310, the control unit 21 determines the exposure time to be a predetermined length of time that is capable of suppressing flicker which occurs when an image of an electronic sign is captured. Based on the exposure time, the control unit 21 determines the predetermined gain, and then proceeds to step S315. Specifically, the exposure time may be an amount of time that is around a period assumed as a flashing cycle of an electronic sign displayed on an electronic display apparatus, or an amount of time longer than this period.

At step S315, the control unit 21 determines whether or not the measurement value of brightness is a threshold prescribed in advance or higher. As a result, the control unit 21 determines whether or not the number of pixels in which saturation occurs when the camera 10 performs imaging at the determined exposure time reaches a level prescribed in advance. Then, when determined Yes at step S315, the control unit 21 proceeds to step S320. When determined No at step S315, the control unit 21 proceeds to step S325.

At step S320, the control unit 21 determines the gain to be a low value such that the brightness measured from the captured image at step S305 is suppressed to the threshold used at step S315 or lower. Specifically, for example, a table may be provided in which a value to be set as gain is registered in association with a measurement value of brightness exceeding the threshold. The control unit 21 may then determine the value of the gain by referencing the table.

Figure 6:
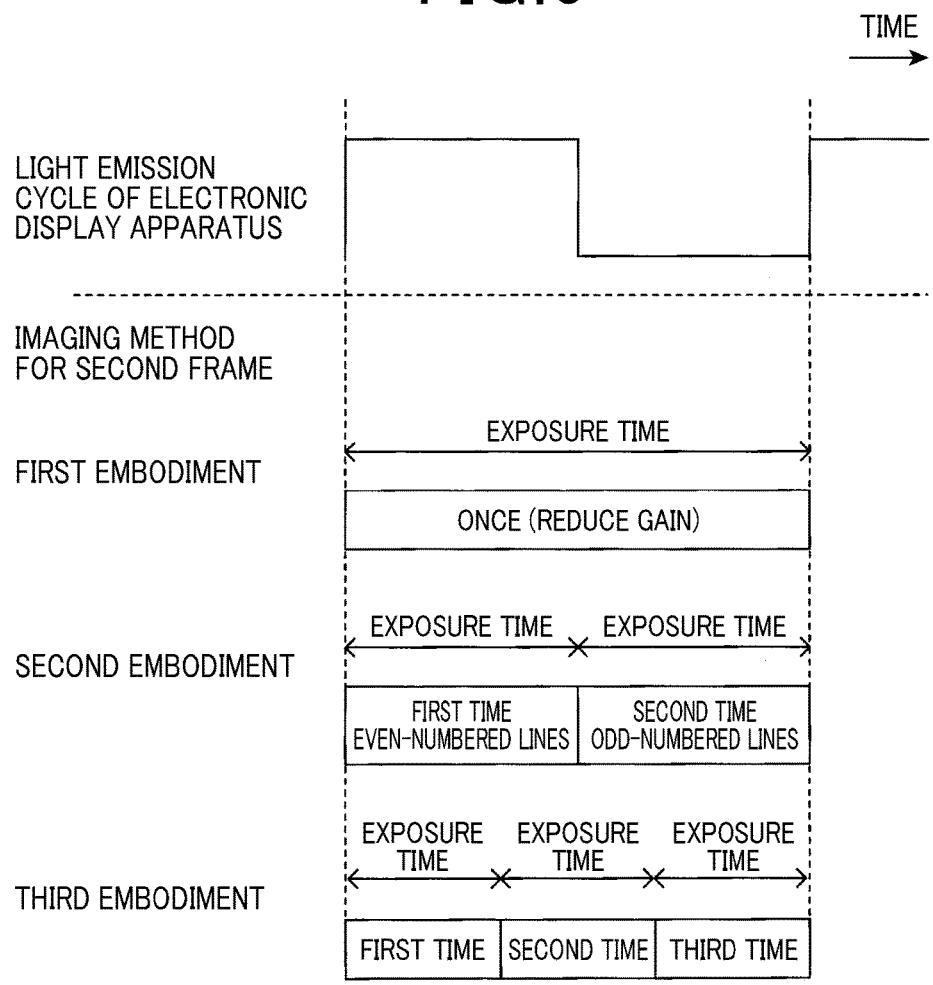
FIG. 6 is an explanatory diagram of exposure time for a second frame according to the first to third embodiments.

That is, according to the first embodiment, when the second frame is captured, imaging is performed with a long exposure time that is equal to or longer than the period assumed as the flashing cycle of an electronic sign. In addition, when significant saturation is predicted to occur as a result of the exposure time being increased, the gain is reduced to suppress saturation (FIG. 6).

At step S325, the control unit 21 sets the determined exposure time, gain, and the like in the imager 11 of the camera 10, and ends the present process.

[Effects]

In the image generation system 1 according to the first embodiment, the first frame and the second frame are generated by the single camera 10, at each imaging timing. The first frame is suitable for image recognition of a signboard sign. The second frame is suitable for image recognition of an electronic sign. Therefore, through selective use of these frames, both the signboard sign and the electronic sign can be recognized with high accuracy. As a result, a driving-related process based on the signboard sign and the electronic sign can be performed with high accuracy using the single camera 10.

In addition, the exposure time when the first frame is captured is set to the exposure time limit or lower. The exposure time limit is prescribed based on the vehicle speed of the own vehicle and whether it is day or night. Therefore, blurring of the captured image can be kept within the allowable range with certainty. Furthermore, when the exposure time limit does not satisfy the exposure time that is normally required, a high gain is set in the imager 11 of the camera 10. The high gain is prescribed based on the ratio of the normally required exposure time and the exposure time limit. Therefore, the luminance of the captured image can be made suitable while suppressing blurring.

In addition, when the second frame is captured, an exposure time enabling flicker to be suppressed is set. In addition, when a large number of saturated pixels is predicted to be generated, a low gain is set in the imager 11 of the camera 10. As a result, saturation can be suppressed.

Second Embodiment

Next, the image generation system 1 according to a second embodiment will be described. The image generation system 1 according to the second embodiment is configured by the camera 10 and the image generation apparatus 20 similar to those according to the first embodiment. However, the content of the processes differs in part. Hereafter, the differences will mainly be described.

According to the second embodiment, the image generation apparatus 20 performs the imaging process when a periodic imaging timing arrives. The first and second frames are thereby captured. However, the method for capturing the second frame differs from that according to the first embodiment.

Specifically, according to the second embodiment, when the imaging timing arrives, imaging is continuously performed twice (FIG. 6). Here, the exposure time is set to that enabling the number of pixels in which saturation occurs to be kept at a level prescribed in advance or less (for example, an amount of time that is about half the period assumed as the flashing cycle of an electronic sign). At this time, during the first imaging operation, image data of even-numbered lines configuring the captured image is generated. During the second imaging operation, image data of odd-numbered lines configuring the captured image is generated. The second frame is generated as a result of these captured images being combined.

The lines configuring the image captured by the camera 10 are given numbers starting from 1, in sequence from an upper end side. An even-numbered line refers to a line that is given an even number. An odd-numbered line refers to a line that is given an odd number.

Figure 7:
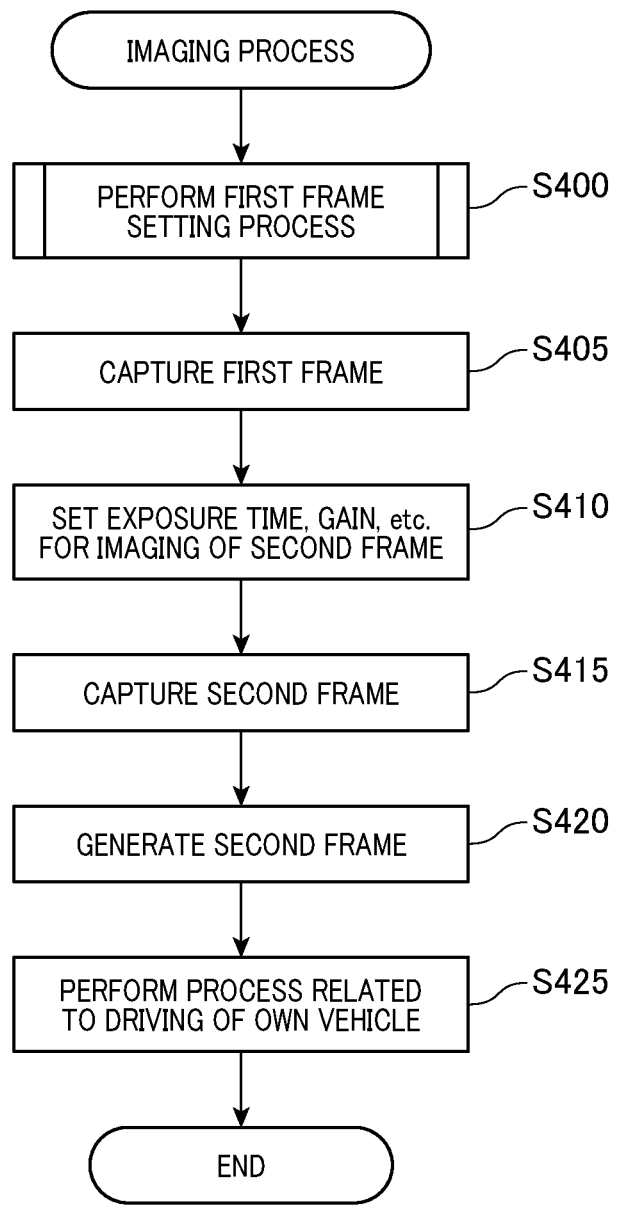
FIG. 7 is a flowchart of an imaging process according to the second and third embodiments.

The imaging process according to the second embodiment will be described below (FIG. 7). The present process is performed by the image generation apparatus 20 when a periodic imaging timing arrives. In the process, steps S400 and S405 are similar to steps S100 and S105 of the imaging process according to the first embodiment. Therefore, description thereof is omitted.

At step S410, the control unit 21 sets the exposure time of the camera 10 to an amount of time that is about half the flashing cycle of an electronic sign. In addition, the control unit 21 sets the gain and the like of the camera 10 based on the exposure time. The control unit 21 then proceeds to step S415.

At step S415, the control unit 21 performs imaging with the camera 10, twice. At this time, during the first imaging operation, the control unit 21 stores, in the memory 24, only the image data configuring the even-numbered lines of the captured image outputted from the camera 10. During the second imaging operation, the control unit 21 stores, in the memory 24, only the image data configuring the odd-numbered lines of the captured image outputted from the camera 10.

The method for capturing the second frame is not limited to the foregoing. During the first imaging operation, the camera 10 may be made to perform imaging with image sensors corresponding to the even-numbered lines. The image data of the even-numbered lines may then be stored in the memory 24. In addition, during the second imaging operation, the camera 10 may be made to perform imaging with image sensors corresponding to the odd-numbered lines. The image data of the odd-numbered lines may then be stored in the memory 24.

At subsequent step S420, the control unit 21 generates the second frame by combining the image data of the even-numbered lines and the image data of the odd-numbered lines. In addition, the control unit 21 stores the second frame in the memory 24. Here, the pieces of image data of the lines are arrayed in the appropriate sequence.

Subsequent step S425 is similar to step S120 of the imaging process according to the first embodiment. Therefore, description thereof is omitted.

[Effects]

In the image generation system 1 according to the second embodiment, imaging is performed twice at the imaging timing of the second frame. Here, the exposure time is about half the period assumed as the flashing cycle of an electronic sign. During the first imaging operation, image data of the even-numbered lines is generated. During the second imaging operation, image data of the odd-numbered lines is generated. The second frame is generated by these captured images being combined.

Therefore, a captured image in which saturation is reduced is generated from the pieces of image data. In addition, even should flicker occur in either of the image data of the even-numbered lines and the image data of the odd-numbered lines, as long as flicker does not occur in the other, flicker is suppressed in the overall second frame. Furthermore, the total exposure time of the two imaging operations amounts to about the flash cycle of an electronic sign. Therefore, even should flicker occur during one imaging operation, flicker can be suppressed during the other imaging operation. Therefore, flicker can be more reliably suppressed in the second frame.

Third Embodiment

Next, the image generation system 1 according to the third embodiment will be described. The image generation system 1 according to the third embodiment is configured by the camera 10 and the image generation apparatus 20, similar to those according to the second embodiment. Processes similar to those according to the second embodiment are performed. However, the method for capturing the second frame differs from that according to the second embodiment.

Specifically, according to the third embodiment, when the imaging timing arrives, the second frame is continuously captured using three imaging operations (FIG. 6). Here, the exposure time is set to that enabling the number of pixels in which saturation occurs to be kept at a level prescribed in advance or less (for example, an amount of time that is about one-third the period assumed as the flashing cycle of an electronic sign). The second frame is generated as a result of these captured images being combined.

The number of imaging operations at the imaging timing is not limited to three. Imaging may be performed twice, or four or more times. The second frame may then be generated by the captured images being combined. At this time, the total exposure time of these imaging operations is preferably an amount of time that is about the flashing cycle of an electronic sign or longer.

The imaging process according to the third embodiment differs from that according to the second embodiment regarding steps S410 to S420 (FIG. 7). The processes at steps S410 to S420 will be described.

At step S410, the control unit 21 sets the exposure time of the camera 10 to an amount of time that is about one-third the flashing cycle of an electronic sign. In addition, the control unit 21 sets the gain and the like of the camera 10 based on the exposure time. The control unit 21 then proceeds to step S415.

At step S415, the control unit 21 performs imaging three times with the camera 10. In addition, the control unit 21 stores the captured images in the memory 24. The control unit 21 then proceeds to step S420.

At step S420, the control unit 21 combines the captured images generated at step S415 and thereby generates the second frame. The second frame in this case is adjusted such that luminance distribution is suitable for the driving-related process. The control unit 21 stores the second frame in the memory 24. The control unit 21 then proceeds to step S425. At this time, the captured images may be combined after positional misalignment among captured images is corrected.

[Effects]

In the image generation system 1 according to the third embodiment, imaging is performed three times at the imaging timing of the second frame. Here, the exposure time is about one-third the period assumed as the flashing cycle of an electronic sign. The second frame is then generated by the captured images being combined.

Therefore, a captured image in which saturation is reduced is generated from the pieces of image data. In addition, even should flicker occur in any of the captured images, as long as flicker does not occur in remaining captured images, flicker is suppressed in the overall second frame. Furthermore, the total exposure time of the three imaging operations amounts to about the flash cycle of an electronic sign. Therefore, even should flicker occur in any of the captured images, flicker can be suppressed in the remaining captured images. Therefore, flicker can be more reliably suppressed in the second frame.

Fourth Embodiment

Next, the image generation system 1 according to a fourth embodiment will be described. The image generation system 1 according to the fourth embodiment is configured by the camera 10 and the image generation apparatus 20 similar to those according to the first embodiment. However, the content of the processes differs in part. Hereafter, the differences will mainly be described.

According to the fourth embodiment, the image generation apparatus 20 performs the imaging process when a periodic imaging timing arrives. However, in the imaging process, a single common frame suitable for image recognition of a signboard sign and image recognition of an electronic sign (in which both blurring and flicker are suppressed) is captured.

Specifically, when the imaging timing arrives, imaging is continuously performed a plurality of times at a short exposure time enabling blurring to be suppressed. Then, positional misalignment among the captured images is corrected. The common frame is then generated by the captured images being combined.

The processes performed by the image generation system 1 according to the fourth embodiment will be described in detail, below.

(1) Imaging Process

Figure 8:
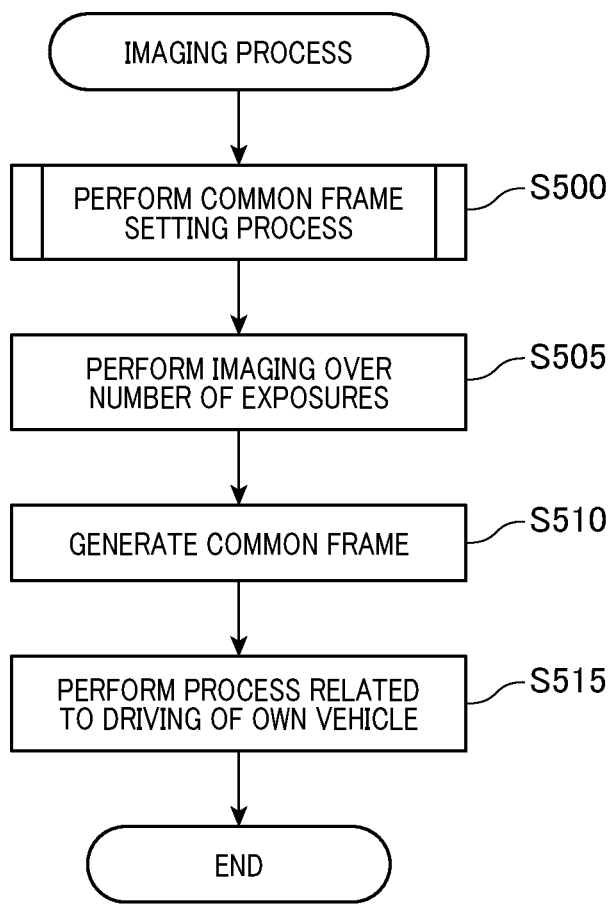
FIG. 8 is a flowchart of an imaging process according to a fourth embodiment.

First, an imaging process for generating the common frame will be described (FIG. 8). The image generation apparatus 20 performs the present process when a periodic imaging timing arrives.

At step S500, the control unit 21 of the image generation apparatus 20 performs a common frame setting process (details are described hereafter) in which the camera 10 is set to a state that enables imaging of the common frame. The control unit 21 then proceeds to step S505.

At step S505, the control unit 21 performs imaging over a number of exposures set for the common frame setting process. The control unit 21 then proceeds to step S510. When step S630 of the common frame setting process, described hereafter, is performed, the number of exposures is set to two times or more. However, when step S630 is not performed, the number of exposures is set to one time.

At step S510, the control unit 21 corrects positional misalignment among the captured images. Specifically, for example, the control unit 21 may extract a feature point from any of the captured images. The feature point is a point at which a plurality of edges intersect. The control unit 21 may then search for the extracted feature point in the other captured images, and associate the feature points among the captured images. Then, the control unit 21 may correct positional misalignment by moving the positions of the pixels in the captured images, such that the respective feature points of the captured images overlap.

Subsequently, the control unit 21 generates the common frame by combining the corrected captured images. The common frame in this case is adjusted such that the luminance distribution is suitable for the driving-related process. The control unit 21 stores the common frame in the memory 24. The control unit 21 then proceeds to step S515.

At step S515, the control unit 21 reads out the common frame from the memory 24. The control unit 21 then enables the driving-related process based on the common frame to be performed. The control unit 21 ends the present process. Specifically, when the image generation apparatus 20 performs the driving-related process, the control unit 21 may give the common frame to the section performing the driving-related process, and make the section start the driving-related process. In addition, when the other ECU 30 performs the driving-related process, the control unit 21 may transmit the common frame to the ECU 30 via the on-board LAN 2, and make the ECU 30 perform the driving-related process.

(2) Common Frame Setting Process

Figure 9:
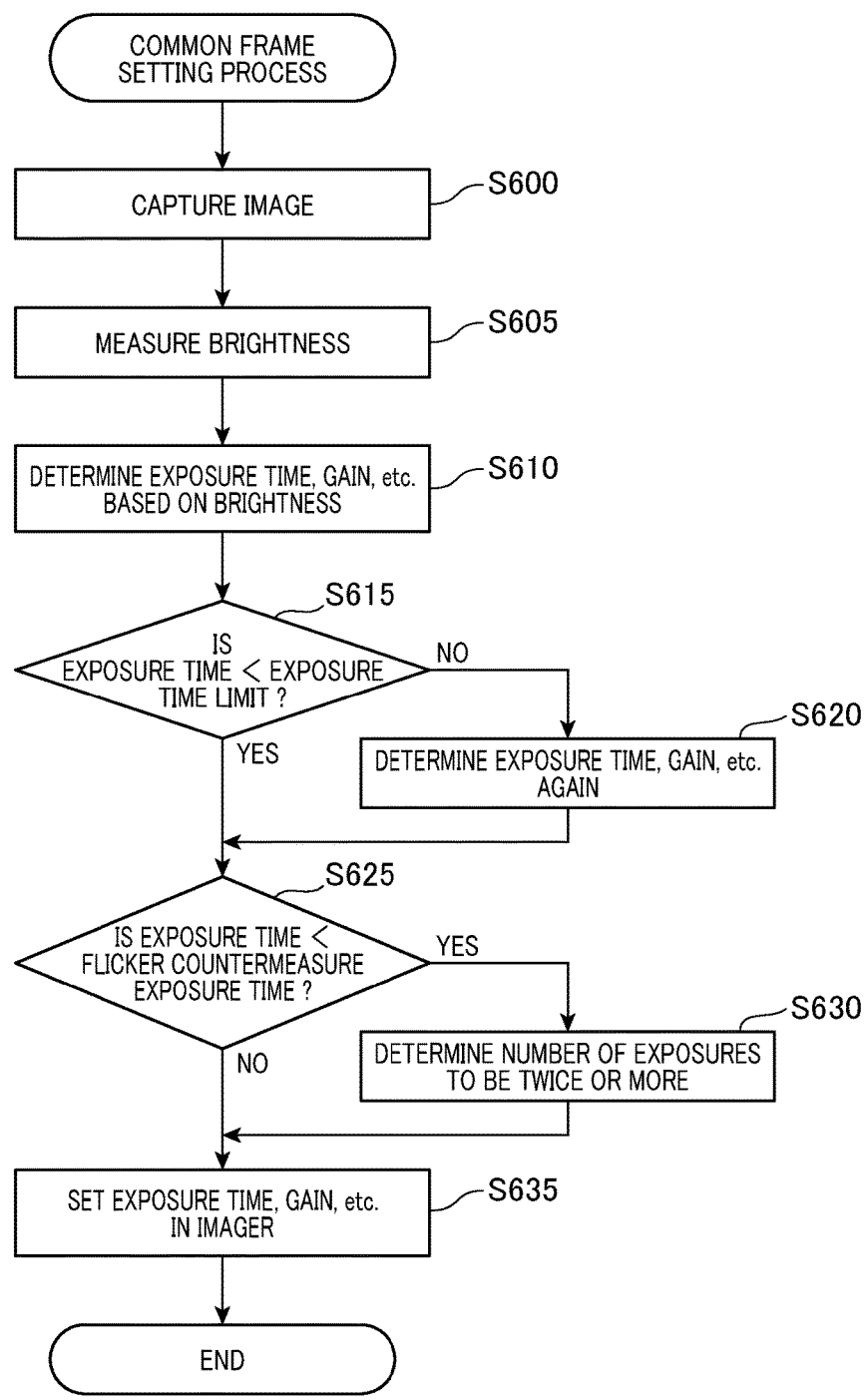
FIG. 9 is a flowchart of a common frame setting process according to the fourth embodiment.

Next, the common frame setting process in which the camera 10 is set to a state that enables the common frame to be captured will be described (FIG. 9). The present process is configured as a subroutine that is called up from the imaging process.

In the process, steps S600 to S620 are similar to steps S200 to S220 of the first frame setting process according to the first embodiment. Therefore, description thereof is omitted.

When determined Yes at step S615 or at step S625 performed after step S620, the control unit 21 determines whether or not the determined exposure time is less than a flicker countermeasure exposure time (such as an amount of time that is about the flashing cycle of an electronic sign) prescribed in advance. When determined Yes at step S625, the control unit 21 proceeds to step S630. When determined No at step S625, the control unit 21 proceeds to step S635.

At step S630, the control unit 21 determines the number of exposures (in other words, the number of times the camera 10 performs imaging) to be two times or more. The control unit 21 then proceeds to step S635. Specifically, for example, the control unit 21 may calculate a value obtained by dividing the flicker countermeasure exposure time by the exposure time determined earlier. The control unit 21 may then round up digits after the decimal point of the obtained value to form the next integer, and set the resulting value as the number of exposures. In other words, the control unit 21 may set the exposure time such that the total exposure time of the imaging operations is the flicker countermeasure exposure time or more.

At step S635, the control unit 21 sets the determined exposure time, gain, and the like in the imager 11 of the camera 10. The control unit 21 then ends the process.

[Effects]

In the image generation system 1 according to the fourth embodiment, a plurality of captured images in which blurring is reduced is generated with the single camera 10. In addition, after positional misalignment among these captured images is corrected, a composite image of these captured images is generated. Blurring is suppressed in each captured image. Therefore, a signboard sign can be recognized with high accuracy from the composite image. In addition, because images captured using a plurality of imaging operations are combined, the luminance distribution can be made suitable for recognition of an electronic sign. Therefore, a driving-related process based on the signboard sign and the electronic sign can be performed with high accuracy using the single camera 10.

Other Embodiments

Embodiments of the present disclosure are described above. However, the present disclosure is not limited to the above-described embodiments. Various other embodiments are possible.

(1) In the image generation system 1 according to the second embodiment, imaging is performed twice at the imaging timing. During the first imaging operation, the image data for the even-numbered lines is generated. During the second imaging operation, the image data for the odd-numbered lines is generated. That is, two types of array patterns are provided as a pattern in which first to Xth lines configuring the captured image are arrayed. In the array patterns, the lines are arrayed with a space amounting to a single line between adjacent lines in the lines.

However, the present disclosure is not limited thereto. In the array patterns, the lines may be arrayed with a space amounting to two or more lines between adjacent lines in the lines. Alternatively, the lines may be arrayed in units of Y (Y>2) lines with a space amounting to a single line or two or more lines between adjacent lines in the lines. In addition, a Z (Z>2) types of array patterns may be provided. Imaging may be performed a Z-number of times at the imaging timing. During each imaging operation, image data of lines corresponding to a different array pattern may be generated. Of course, the array patterns are preferably prescribed such that, when the lines of all of the types of array patterns are combined, all of the lines are arrayed without space therebetween. At this time, the total exposure time of the imaging operations performed at the imaging timing is preferably an amount of time that is about the flashing cycle or longer.

Specifically, for example, three types of array patterns are provided. In this case, the array patterns may respectively be configured by lines of which the sequence is expressed by 3x (x being an integer of 1 or more), lines of which the sequence is expressed by 3x+1, and lines of which the sequence is expressed by 3x+2.

Similar effects can be achieved even when the foregoing configuration is used.

(2) A function provided by a single constituent element according to the above-described embodiments may be dispersed among a plurality of constituent elements. Functions provided by a plurality of constituent elements may be integrated in a single constituent element. In addition, at least a part of a configuration according to the above-described embodiments may be replaced with a publicly known configuration providing a similar function. Furthermore, a part of configuration according to the above-described embodiments may be omitted. Moreover, at least a part of a configuration according to the above-described embodiments may be added to or replace another configuration according to the above-described embodiments. Any embodiment included in the technical concept specified by the wordings of the scope of claims is an embodiment of the present disclosure.

(3) The present disclosure can also be actualized by various modes in addition to the above-described image generation system 1, such as a single apparatus corresponding to the image generation system 1, a program enabling a computer to function as the image generation apparatus 20 configuring the image generation system 1, a recording medium on which the program is recorded, and a method corresponding to the processes performed by the image generation apparatus 20.

[Correspondence to the Claims]

Correspondence between the terms used in the description of the first to fourth embodiments and the terms used in the claims will be indicated.

The sensor unit 23 of the image generation apparatus 20 corresponds to an example of a vehicle speed detecting means.

In the imaging process performed by the control unit 21 of the image generation apparatus 20 according to the first embodiment, step S105 corresponds to an example of a first imaging means; step S115 corresponds to an example of a second imaging means; and step S120 corresponds to an executing means.

In the first frame setting process performed by the control unit 21, steps S210 to S225 correspond to an example of the first imaging means; and step S205 corresponds to an example of a brightness detecting means.

In the second frame setting process performed by the control unit 21, steps S310 to S325 correspond to an example of the second imaging means.

In the imaging process performed by the control unit 21 of the image generation apparatus 20 according to the second and third embodiments, step S405 corresponds to an example of the first imaging means; steps S410 to S420 correspond to an example of the second imaging means; and step S425 corresponds to the executing means.

In the imaging process performed by the control unit 21 of the image generation apparatus 20 according to the fourth embodiment, step S505 corresponds to an example of the imaging means; step S510 corresponds to an example of a generating means; and step S515 corresponds to an example of the executing means.

What is claimed is:

1. An image generation apparatus comprising:
   first imaging operation control means that controls, using a processor, an imaging operation of a camera mounted in an own vehicle to capture an image of a periphery of the own vehicle in a first state that is suitable for capturing an image for recognizing information illustrated on a display board that is a signboard sign, at a predetermined first timing, and generates a first captured image from the image captured in the first state;

second imaging operation control means that controls, using the processor, the imaging operation of the camera to capture an image of the periphery of the own vehicle in a second state that is suitable for capturing an image for recognizing information displayed by light emitted from an electronic display apparatus that is an electronic sign, at a predetermined second timing, and generates a second captured image from the image captured in the second state, wherein the first captured image and the second captured image are sequentially generated; and executing means that performs, using the processor, a process using the first captured image generated by the first imaging operation control means and the second captured image generated by the second imaging operation control means, wherein the second state is a state in which an exposure time of the camera is set so as to suppress flicker generated, when an image of the electronic display apparatus is captured using the imaging operation of the camera, and a gain of a signal from an image sensor of the camera is set so as to suppress saturation in the image captured using the imaging operation of the camera.

2. An image generation apparatus comprising:

first imaging operation control means that controls, using a processor, an imaging operation of a camera mounted in an own vehicle to capture an image of a periphery of the own vehicle in a first state that is suitable for capturing an image for recognizing information illustrated on a display board, at a predetermined first timing, and generates a first captured image from the image captured in the first state;

second imaging operation control means that controls, using the processor, the imaging operation of the camera to capture an image of the periphery of the own vehicle in a second state that is suitable for capturing an image for recognizing information displayed by light emitted from an electronic display apparatus, at a predetermined second timing, and generates a second captured image from the image captured in the second state; and executing means that performs, using the processor, a process using the first captured image generated by the first imaging operation control means and the second captured image generated by the second imaging operation control means, wherein the image captured by the camera is configured by combining a plurality of images with each other, the plurality of images being captured in a plurality of lines that are arrayed in a predetermined number of types of array patterns being a predetermined number of types, each of the types of array patterns having one or more different lines of the plurality of lines that are arrayed with a space amounting to a predetermined number of lines between adjacent lines in the different lines, the image captured by the camera being configured by combining the plurality of images captured in the plurality of lines in all of the types of array patterns with one another; and the second imaging operation control means is configured to:

capture, using a predetermined number of imaging operations of the camera corresponding to the predetermined number of types of array patterns, a plurality of images of the periphery of the own vehicle, at an exposure time of the camera enabling saturation in each of the plurality of images captured using the imaging operations to be suppressed, when the second timing arrives when an image is captured in the second state;

acquire a plurality of images captured in one or more different lines of different type of array patterns by each of the imaging operations performed at the second timing; and generate the second captured image by combining the plurality of images captured in the lines of the respective type of array patterns with one another.

3. An image generation apparatus comprising:

first imaging operation control means that controls, using a processor, an imaging operation of a camera mounted in an own vehicle to capture an image of a periphery of the own vehicle in a first state that is suitable for capturing an image for recognizing information illustrated on a display board, at a predetermined first timing, and generates a first captured image from the image captured in the first state;

second imaging operation control means that controls, using the processor, the imaging operation of the camera to capture an image of the periphery of the own vehicle in a second state that is suitable for capturing an image for recognizing information displayed by light emitted from an electronic display apparatus, at a predetermined second timing, and generates a second captured image from the image captured in the second state;

executing means that performs, using the processor, a process using the first captured image generated by the first imaging operation control means and the second captured image generated by the second imaging operation control means;

vehicle speed detecting means that detects a vehicle speed of the own vehicle; and brightness detecting means that detects brightness of the periphery of the own vehicle, wherein the first state is a state in which an exposure time of the camera is set based on the vehicle speed of the own vehicle, the brightness of the periphery of the own vehicle, and a predetermined allowable blurring range of the image captured using the imaging operation of the camera, and the second state is a state in which an exposure time of the camera is set so as to suppress flicker generated, when an image of the electronic display apparatus is captured using the imaging operation of the camera, and a gain of a signal from an image sensor of the camera is set so as to suppress saturation in the image captured using the imaging operation of the camera.

4. An image generation apparatus comprising:

first imaging operation control means that controls, using a processor, an imaging operation of a camera mounted in an own vehicle to capture an image of a periphery of the own vehicle in a first state that is suitable for capturing an image for recognizing information illustrated on a display board, at a predetermined first timing, and generates a first captured image from the image captured in the first state;

second imaging operation control means that controls, using the processor, the imaging operation of the camera to capture an image of the periphery of the own vehicle in a second state that is suitable for capturing an image for recognizing information displayed by light emitted from an electronic display apparatus, at a predetermined second timing, and generates a second captured image from the image captured in the second state;

executing means that performs, using the processor, a process using the first captured image generated by the first imaging operation control means and the second captured image generated by the second imaging operation control means;

vehicle speed detecting means that detects a vehicle speed of the own vehicle; and brightness detecting means that detects brightness of the periphery of the own vehicle, wherein:

the first state is a state in which an exposure time of the camera is set based on the vehicle speed of the own vehicle, the brightness of the periphery of the own vehicle, and a predetermined allowable blurring range of the image captured using the imaging operation of the camera;

the image captured using the camera is configured by combining a plurality of images with each other, the plurality of images being captured in a plurality of lines that are arrayed in a predetermined number of types of array patterns being a predetermined number of types, each of the types of array patterns having one or more different lines of the plurality of lines that are arrayed with a space amounting to a predetermined number of lines between adjacent lines in the different lines, the image captured by the camera being configured by combining the plurality of images captured in the plurality of lines in all of the types of array patterns with one another; and the second imaging operation control means is configured to:

capture, using a predetermined number of imaging operations of the camera corresponding to the predetermined number of types of array patterns, a plurality of images of the periphery of the own vehicle, at an exposure time of the camera enabling saturation in each of the plurality of images captured using the imaging operations to be suppressed, when the second timing arrives when an image is captured in the second state;

acquire a plurality of images captured in one or more different lines of different type of array patterns by each of the imaging operations performed at the second timing; and generate the second captured image by combining the plurality of images captured in the lines of the respective type of array patterns with one another.

5. An image generation apparatus comprising: first imaging operation control means that controls, using a processor, an imaging operation of a camera mounted in an own vehicle to capture an image of a periphery of the own vehicle in a first state that is suitable for capturing an image for recognizing information illustrated on a display board that is a signboard sign, at a predetermined first timing, and generates a first captured image from the image captured in the first state; second imaging operation control means that controls, using the processor, the imaging operation of the camera to capture an image of the periphery of the own vehicle in a second state that is suitable for capturing an image for recognizing information displayed by light emitted from an electronic display apparatus that is an electronic sign, at a predetermined second timing, and generates a second captured image from the image captured in the second state, wherein the first captured image and the second captured image are sequentially generated; executing means that performs, using the processor, a process using the first captured image generated by the first imaging operation control means and the second captured image generated by the second imaging operation control means; vehicle speed detecting means that detects a vehicle speed of the own vehicle; and brightness detecting means that detects brightness of the periphery of the own vehicle, wherein the first state is a state in which an exposure time of the camera is set based on the vehicle speed of the own vehicle, the brightness of the periphery of the own vehicle, and a predetermine allowable blurring range of the image captured using the imaging operation of the camera, and the second imaging operation control means captures, using a plurality of imaging operations of the camera, a plurality of images of the periphery of the own vehicle, at an exposure time of the camera enabling saturation to be suppressed, when the second timing arrives when capturing an image in the second state, and generates the second captured image based on the images captured using the plurality of imaging operations.

6. An image generation apparatus comprising:

imaging operation control means that controls, using a processor, a plurality of imaging operation of a camera mounted in an own vehicle to capture a plurality of images of a periphery of the own vehicle, at an exposure time enabling blurring of each of the plurality of images captured using the plurality of imaging operations to be kept within a predetermined allowable range that enables flicker occurring when an image of an electronic sign is captured to be suppressed, at a predetermined timing, and generates a plurality of captured images from the plurality of images captured using the plurality of imaging operations;

generating means that corrects, using the processor, positional misalignment of each of the plurality of captured images at the predetermined timing, and subsequently generates a composite image by combining the plurality of captured images with one another; and executing means that performs, using the processor, a process using the composite image.

* * * * *

UNITED STATES PATENT AND TRADEMARK OFFICE
CERTIFICATE OF CORRECTION

PATENT NO.         : 10,228,699 B2
APPLICATION NO.    : 15/159473
DATED              : March 12, 2019
INVENTOR(S)        : Toshikazu Murao It is certified that error appears in the above-identified patent and that said Letters Patent is hereby corrected as shown below:

In the Claims

Column 16, Line 24 (approx.), in Claim 5, change "predetermine" to --predetermined--.

Signed and Sealed this
Eighteenth Day of June, 2019

Andrei Iancu
*Director of the United States Patent and Trademark Office*